No. 727,391. PATENTED MAY 5, 1903.
W. T. LEMAN.
CONDENSER.
APPLICATION FILED JUNE 24, 1902.
NO MODEL.
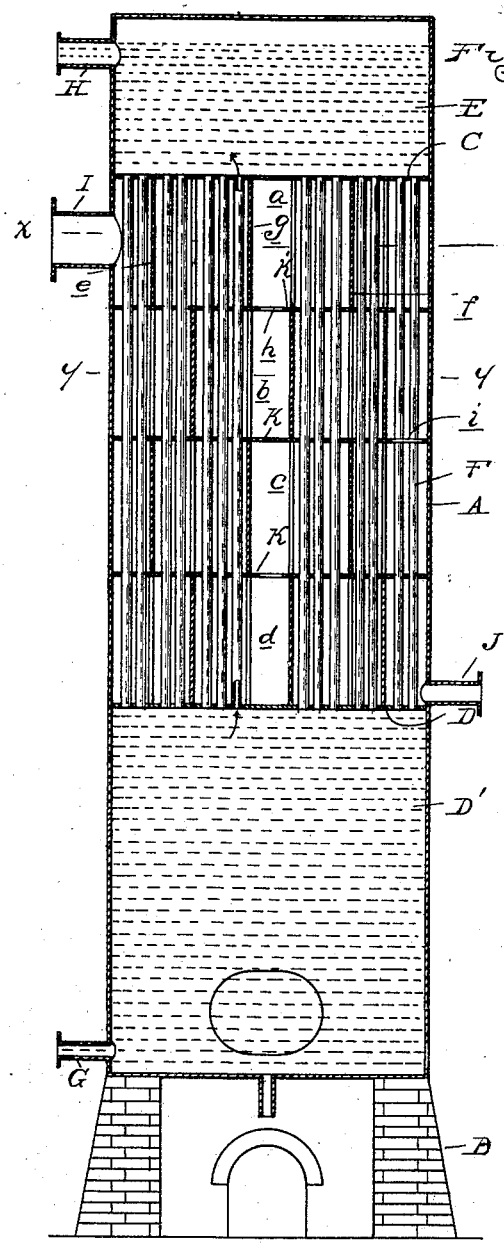
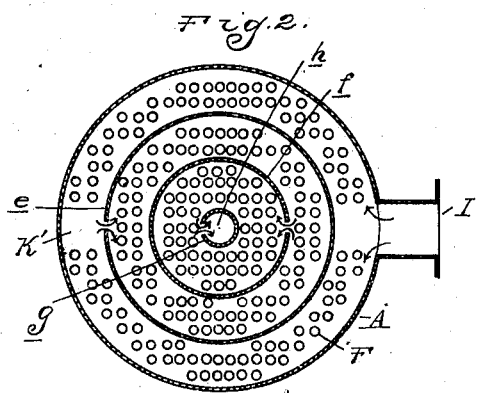
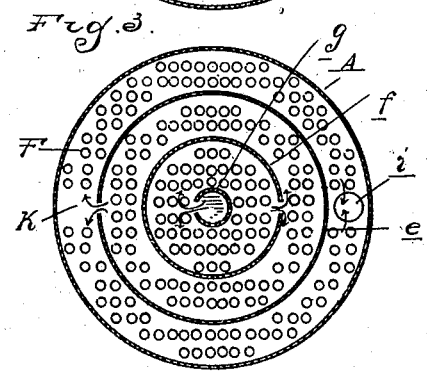
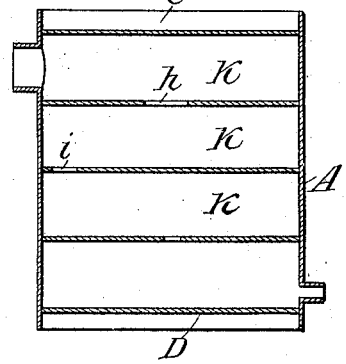
Witnesses
Inventor
William T. Leman No. 727,391. Patented May 5, 1903.

UNITED STATES PATENT OFFICE.

WILLIAM T. LEMAN, OF BAYONNE, NEW JERSEY.

CONDENSER.

SPECIFICATION forming part of Letters Patent No. 727,391, dated May 5, 1903.

Application filed June 24, 1902. Serial No. 113,012. (No model.)

*To all whom it may concern:*

Be it known that I, WILLIAM T. LEMAN, a citizen of the United States, residing at Bayonne, in the county of Hudson and State of New Jersey, have invented certain new and useful Improvements in Condensers, of which the following is a specification, reference being had therein to the accompanying drawings.

The invention relates to improvements in condensers more especially designed for use in connection with the distillation of petroleum-oils. For this purpose it is of great importance that condensers should be so constructed as not to place any back pressure upon the still, and it is of equal importance that none of the condensable products should escape from the condenser in gaseous form and that the products of condensation should be delivered from the condenser at or near the initial temperature of the cooling medium.

It is therefore the object of the present invention to obtain a construction which will fulfil all of the conditions above mentioned, thus preventing loss of valuable products and economizing in fuel necessary for operating the still and improving the quality of the products of condensation.

The invention consists in the peculiar construction of a condenser in which the cooling medium is passed through the flues while the vapors to be condensed are passed around the latter; further, in the construction and arrangement of baffle-plates adapted to direct the vapors transversely of said tubes and to frequently change the direction, so as to insure complete condensation.

The invention further consists in the peculiar construction and combination of parts, as hereinafter described and claimed.

In the drawings, Figure 1 is a vertical central section through the condenser. Fig. 2 is a cross-section thereof on line $x\,x$. Fig. 3 is a similar cross-section on line $y\,y$. Fig. 4 is a diagrammatic view similar to Fig. 1, showing baffle-plates having apertures therein which are progressively diminished in size.

A is a cylindrical casing arranged upon a vertical axis and mounted in suitable supports, such as the base B. This casing is divided by horizontal partitions C and D into the compartments, comprising a lower compartment D', an intermediate compartment, and an upper compartment E. These compartments D' and E are connected with each other by flues F passing through the intermediate compartment and arranged in close proximity to each other.

G is a water-inlet connection with the base of the compartment D'.

H is an outlet connection at the upper end of the compartment E, and I and J are connections, respectively, with the upper and lower ends of the intermediate compartment, the former being an inlet for the vapors and the latter an outlet for the condensed product.

In order that the greatest efficiency be obtained from the condensing-surface, it is desirable that the vapors be directed against the side of the flues. This is accomplished by arranging a series of horizontal partitions or baffle-plates K and K', which divide the intermediate compartment into a series of chambers, such as $a, b, c,$ and $d$. These chambers communicate with each other alternately at the center and the periphery and in each is arranged a series of vertical baffle-plates, which compel the gases to pass alternately from one side to the other. As shown in Fig. 2, the compartment $a$ is divided by the circular baffle-plates $e, f,$ and $g$, which are arranged concentrically within the casing and extend between the horizontal baffle-plate K' and the partition C. The baffle-plate $e$ is slotted upon the side opposite that in which the vapor-conduit I enters, so that the vapors are first compelled to travel oppositely around the casing between the outer shell and the baffle-plate $e$. They will then pass through the slot in said baffle-plate and will pass backward again between the plates $e$ and $f$, the latter being slotted upon the opposite side to admit the vapors into the space between the plate $f$ and the plate $g$. It will thus be understood that in passing back and forth around these baffle-plates the vapors are continually directed against the vertically-extending flues which are in their path. When the center is reached, the vapors pass downward through the apertures $h$ in the plate K' and are then directed back and forth by another set of vertical baffle-plates similar in construction until the outer wall of the casing is again reached. Here the vapors will descend through the marginal opening I through the plate K, and the operation will be continued until finally the outlet J is reached.

It will be noted that the water or other cooling medium employed passes upward through the flues F, while the heated vapors first come in contact with said flues at the upper end thereof and gradually pass downward. The result will be that the vapors directly from the still will come in contact with that portion of the flues which contains water partially heated from contact with the vapors lower down in the condenser. This will serve to condense the more easily-condensable vapors, while the lighter products will pass farther downward, being constantly brought in contact with colder condensing-surfaces. As a result practically all condensable products are prevented from escaping.

While the arrangement of baffle-plates described is such as to constantly redirect the vapors against the condensing-surface, the progress of said vapors is not impeded, as at all points ample area is provided. Moreover, the condensed products will run down the flues and the baffle-plates and will not get in the way of the vapor, so as to impede its progress. The result is that not only is back pressure upon the still prevented, but experience has demonstrated that at times the pressure is actually reduced below atmospheric pressure, for the reason that the vapors are condensed more rapidly than they are furnished by the still. It is well understood that wherever back pressure is placed upon the still the amount of fuel is proportionately increased, and this is prevented by the construction described. Furthermore, the holding of the vapors in the still by back pressure thereon injures the color of the products of condensation and makes them more difficult to refine.

The apertures in the baffle-plates preferably progressively diminish in size from top to bottom correspondingly to the diminution of column of vapor passing therethrough.

What I claim as my invention is—

1. A condenser comprising a casing having a plurality of flues extending vertically therethrough, means for passing a cooling agent upward through said flues, means for admitting the vapor into the upper end of said casing around said flues and baffle-plates for directing the vapor back and forth in parallel substantially concentric segmental courses across the path of said flue and progressively downward.

2. A condenser comprising a casing having a plurality of flues extending therethrough, means for passing a cooling agent through said flues, means for admitting vapor into said casing at one side thereof, and an annular baffle-plate arranged between the flues within said casing adapted to compel the vapors to pass around parallel to the outer wall thereof across the path of the outer flues, said baffle-plate being apertured on the opposite side thereof to admit the vapors into the space within the same and into contact with the inner flues.

3. A condenser comprising a casing having a plurality of flues extending therethrough, means for passing a cooling agent through said flues, a baffle-plate extending transversely across within said casing around said flues and centrally apertured, annular baffle-plates arranged between the flues upon opposite sides of said transverse plate and apertured on one side, said baffle-plate being adapted to direct the vapors across the path of said flues in a circuitous course and alternately toward the center and periphery of said casing.

4. A condenser comprising a casing having a plurality of flues extending vertically therethrough, means for passing a cooling agent upward through said flues, means for admitting vapor into said casing at the upper end thereof and a series of horizontal and annular baffle-plates arranged within said casing across and between said flues, and adapted to direct the vapor in a circuitous course across the path of said flues alternately toward the center and the periphery of said casing and progressively downward.

5. A condenser comprising a casing having a plurality of flues passing therethrough, means for passing a cooling agent through said flues, means for admitting vapor into said casing at one end thereof and a series of baffle-plates for directing the vapors back and forth across the path of said flues, said plates having apertures alternately at opposite sides for the passage of the vapor, said apertures being progressively reduced in area to correspond to the diminution in volume of vapor.

In testimony whereof I affix my signature in presence of two witnesses.

WILLIAM T. LEMAN.

Witnesses:
H. D. HAVEN,
E. Z. KLINGLER.